United States Patent Office 2,898,358
Patented Aug. 4, 1959

2,898,358

RESOLUTION OF ENANTIOMORPHIC MIXTURES

Basil B. Dowling, Skokie, Ill., assignor to International Minerals & Chemical Corporation, a corporation of New York No Drawing. Application July 29, 1957
Serial No. 674,585

11 Claims. (Cl. 260—429.9)

This invention relates to a process for resolving mixed enantiomorphs of crystalline optically active compounds, and more particularly, to a process for resolving a mixture of D- and L-alpha-amino carboxylic acids.

The synthesis of amino acids has been investigated intensively during recent years in order to develop a more convenient and economical source of such materials. The synthetic acids, however, are always obtained in racemic form (i.e., an equimolar mixture of the optically active isomers), whereas the naturally occurring acids are uniformly the L-enantiomorph. It is accordingly desirable, and in many cases necessary, to separate the synthetic acids into the individual enantiomorphs. One suitable method, described by Joseph L. Purvis in application Serial No. 599,358, filed July 23, 1956, now abandoned, involves seeding a supersaturated solution of DL-glutamic acid with crystals of D- or L-glutamic acid and crystallizing the seeded isomer therefrom. In the Purvis technique, crystals of the unseeded enantiomorph eventually appear in the product if the crystallization time is sufficiently prolonged, and for this reason Purvis found it necessary to limit the crystallization time to avoid such spontaneous crystallization of the unseeded enantiomorph from the solution. The present invention is an improvement upon the Purvis technique which makes it unnecessary to limit the crystallization time.

One object of the present invention is to separate mixed enantiomorphs of crystalline optically active compounds.

Another object is to provide a process for the resolution of mixtures of amino acid enantiomorphs, and in particular for the resolution of DL-glutamic acid.

Another object is to provide a commercially feasible process for resolving DL-glutamic acid.

Another object is to effect the simultaneous or nearly simultaneous crystallization of D- and L-glutamic acid from a solution thereof in forms which are readily separable by physical means.

Other objects of the invention will be apparent from the following description.

I have now discovered that mixed enantiomorphs can be selectively crystallized from a supersaturated solution thereof and resolved by seeding the solution with crystals of one enantiomorph having a mesh size greater than about 150 mesh (U.S. Standard Sieve Series), allowing both enantiomorphs to crystallize, separating the crystals from the resulting slurry, and separating the crystals into at least two fractions, at least one of which has a minimum mesh size equal to or greater than the minimum mesh size of the seed crystals. I find that the crystals which are equal to or greater than the seed crystals in size comprise the seeded enantiomorph in a purity around 90% or higher, while the smaller crystals are largely the other enantiomorph.

In one embodiment of the invention, an aqueous solution containing D- and L-glutamic acids at concentrations above the saturation levels is seeded with +150 mesh crystals of L-glutamic acid, and crystallization is allowed to proceed until the supersaturation has been substantially completely discharged. The resulting slurry is filtered, and the crystals are dried and screened into a +150 mesh and a −150 mesh fraction. The +150 mesh fraction comprises about 90% L-glutamic acid, while the −150 mesh fraction comprises about 90% D-glutamic acid.

Alternatively, +150 mesh seed crystals of D-glutamic acid can be used, whereupon the larger and smaller product fractions are D- and L-glutamic acid respectively.

The foregoing technique is conveniently applied to the resolution of DL-glutamic acid.

In another embodiment of the invention, a supersaturated solution of D- and L-glutamic acid is seeded with large crystals of one enantiomorph and small crystals of the other enantiomorph, the crystals differing in size by at least about 100 mesh. The crystallization of both enantiomorphs is thereby facilitated, while the crystal crop is readily separated into the desired fractions by mechanical classification.

The invention can be satisfactorily employed to resolve any mixture of enantiomorphs which is susceptible to resolution by selective seeding as in the technique of Purvis referred to above. Thus, the technique can be applied to the resolution of mixtures of many enantiomorphic glutamic acid compounds, both the glutamate salts and the strong acid salts of glutamic acid, including the D- and L- forms of glutamic acid hydrochloride, glutamic acid hydrobromide, glutamic acid hydriodide, ammonium glutamate, zinc glutamate, calcium glutamate, and the like.

According to a more specific embodiment of the invention, a solution supersaturated with respect to DL-glutamic acid hydrochloride and having a pH below about 0.6 is prepared by dissolving glutamic acid hydrochloride in water and adding a sufficient quantity of concentrated hydrochloric acid to render the solution supersaturated. The solution will contain from about 5 to about 50 parts by weight of DL-glutamic acid hydrochloride per 100 parts of solution at temperatures in the range of 15 to 40° C., varying as a direct function of the temperature, and from 30 parts by weight of hydrogen chloride downward to or approaching the zero level, varying as an inverse function of the DL-glutamic acid hydrochloride level. The degree of supersaturation should be in the range of about 10 to about 100% based on the saturation level, preferably between about 30 and about 60%. The solution should preferably contain between about 10 and about 30% by weight of DL-glutamic acid hydrochloride and preferably between about 20 and about 5% by weight of excess hydrogen chloride. The solution is seeded with crystals of L-glutamic acid hydrochloride or D-glutamic acid hydrochloride of greater than 150 mesh size in an amount preferably at least about 5% by weight based on the weight of DL-glutamic acid hydrochloride in the solution, and optimally between about 10 and about 20% by weight on this basis. The seeded solution is agitated gently, preferably at room temperature (20–30° C.), to permit solids to crystallize therefrom. The initial crystals are substantially completely of the seeded form, and the yield of such crystals reaches a maximum in about 10 to 60 minutes. The other enantiomorph meanwhile begins to crystallize in the form of very small crystals, which act as seed crystals to accelerate the further crystallization thereof. The crystallization is suitably continued until the supersaturation is completely or nearly completely discharged. The crystallized solids comprise a mixture of D- and L-glutamic acid hydrochloride crystals in two groups according to crystal size. The larger crystals, greater than 150 mesh, comprise around 90% or more of the enantiomorph with which the solution was originally seeded. The smaller crystals, less than 150 mesh in size, are largely the other enantiomorph. This mixture is conveniently filtered off, dried, and screened to separate the two classes of crystals. Alternatively, the original slurry can be subjected to hydraulic classification, after which the groups of crystals can be separated from the slurry fractions. In another method, the dried crystal mixture can be subjected to pneumatic classification in an analogous manner, using a controlled stream of air. Other techniques for effecting the classification of the crystals according to mesh size are readily ascertainable from the prior art.

In carrying out the process of my invention, the supersaturated solution is seeded with at least one enantiomorph of the substance which is to be resolved. When the seeding is effected with only one enantiomorph, the seed crystals should be greater than about 150 mesh in size, and should preferably be between about 25 and 100 mesh in size. Larger crystals are not ordinarily employed, since such "crystals" are ordinarily found to be only fragile clusters of smaller crystals, which would tend to disintegrate under the conditions employed.

When seeding with both enantiomorphs is employed, the seed crystals should differ in mesh size by at least about 100. For example, when the crystals of one enantiomorph are greater than 40 mesh, the crystals of the other enantiomorph should be smaller than 140 mesh; or when one is greater than 100 mesh, the other should be smaller than 200 mesh. The difference in mesh size may advantageously be as great as 200. In a preferred embodiment of the invention, the crystals of one enantiomorph range from 25 to 100 mesh in size, while the crystals of the other enantiomorph range from 200 to 300 mesh.

The size of the seed crystals is referred to above for convenience in terms of certain mesh sizes. It should be understood, however, that this means only that the seed crystals, or more realistically the clumps or clusters of crystals of varying size, are retained on screens of the designated mesh size. Glutamic acid hydrochloride crystals, for example, are long, flat plates of varying widths which tend to grow upon or to adhere to other crystals, and from which small fragments are easily broken off. With this type of crystal, the effectiveness of the present resolution process is somewhat less than with starting materials which crystallize in different systems. The technique is, nevertheless, capable of producing products containing around 90% or more of the desired enantiomorph.

The amount of seed crystals may vary widely. Some degree of resolution can be obtained with very small quantities of seed crystals. Ordinarily, however, the "large" seed crystals are used in a proportion between about 1 and about 20% by weight based on the corresponding enantiomorph in the solution, preferably around 5 to 10%. The "small" seed crystals, when employed, may be used in a proportion between about 0.1 to about 1% by weight or more, based upon the corresponding enantiomorph in the solution, preferably around 0.2%.

My process is operative at any temperature from around 0 to about 100° C., so long as the solution is supersaturated. I prefer, however, to employ temperatures between about 15 and about 40° C., optimally between about 20 and about 30° C. The required supersaturation can conveniently be produced by dissolving the starting material at an elevated temperature, then cooling. In this case, seeding may, and preferably should, be started at an elevated temperature during the cooling operation, but should be deferred until the solution has become at least saturated. Regulation of the rate of cooling thereafter permits controlled crystallization at a minimum supersaturation, so that the crystals grow more cleanly and can be separated more readily. The crystallization time may range from one minute to several hours or more, or until the supersaturation has been completely discharged. In the latter case, it is desirable to regulate the speed of crystallization so that at least about one hour and preferably about one to two hours are required in order to produce crystals which can readily be classified.

In another embodiment of the invention, a supersaturated solution of monoammonium DL-glutamate is seeded with large crystals of monoammonium L-glutamate and small crystals of monoammonium D-glutamate at a pH between about 6 and about 9 and a temperature between about 15 and about 35° C.; and after the supersaturation has been discharged, the crystals are filtered off, dried, and screened. The larger crystals are predominantly the L-isomer, while the smaller crystals are the D-isomer.

In a further embodiment, zinc DL-glutamate is resolved in an analogous manner.

I prefer to carry out my process in a solution containing water as the only solvent. I may, however, incorporate in the solution a quantity of methanol, ethanol, isopropyl alcohol, acetone, or other water-miscible oxygen-containing organic solvent in order to adjust the supersaturation level, to increase the fluidity of the solution, or for other purposes. The quantity of such added solvent may suitably be up to about 25% by volume, based upon the total solution.

In every case, it is to be understood that the crystallization employed in my invention is carried out at or near the natural pH level of the substance undergoing resolution. For glutamic acid, this is around pH 3.2. For glutamic acid hydrochloride, this is below about 0.6. For monoammonium glutamate, the pH is around 7. The pH level for other substances is readily ascertainable from the art.

The following operating examples will more clearly illustrate my invention.

*Example 1*

An aqueous solution weighing 203.5 grams and containing 54% by weight of DL-glutamic acid hydrochloride was seeded at 40° C. with 5.6 grams of +25 mesh L-glutamic acid hydrochloride and 0.2 gram of −200 mesh D-glutamic acid hydrochloride. The mixture was cooled to 30° C. and stirred for a period of one hour, during which time crystallization took place. The resulting slurry was filtered, and the crystals were washed, dried, and screened. The +25 mesh fraction, weighing 14.3 grams, contained 96.5% (13.8 grams) of L-glutamic acid hydrochloride, or 8.2 grams in excess of the seed weight. This represents a recovery of 14.9% of the L-glutamic acid hydrochloride present in the racemic starting mixture.

*Example 2*

An aqueous solution of DL-glutamic acid hydrochloride weighing 203.5 grams and containing 54% by weight of DL-glutamic acid hydrochloride was seeded at 30° C. with 5.5 grams of 60 to 100 mesh L-glutamic acid hydrochloride and 0.1 gram of −200 mesh D-glutamic acid hydrochloride. The mixture was stirred one hour at 30° C., during which time crystallization took place. The resulting slurry was filtered, and the crystals were washed, dried, and screened. The +60 mesh fraction, weighing 22.33 grams, contained 89.6% (20.0 grams) of L-glutamic acid hydrochloride, or 14.5 grams in excess of the seed weight. This corresponds to a recovery of 26.4% of the L-glutamic acid hydrochloride present in the racemic starting mixture.

*Example 3*

An aqueous solution weighing 200 grams and containing 55% by weight of DL-glutamic acid hydrochloride was seeded with 5.5 grams of +40 mesh L-glutamic acid hydrochloride at 55° C. The mixture was cooled to 30° C. and stirred for one hour. The crystals were filtered out, washed, dried, and screened. The +40 mesh fraction, weighing 16.8 grams, contained 92.75%

(15.6 grams) of L-glutamic acid hydrochloride, or 10.1 grams in excess of the seed weight. This corresponds to an 18.4% recovery of the L-isomer present in the starting mixture.

Example 4

An aqueous solution weighing 200 grams and containing 25% by weight of DL-glutamic acid hydrochloride and 10% by weight of hydrogen chloride was seeded with 2.5 grams of +40 mesh L-glutamic acid hydrochloride. The mixture was stirred at 30° C. for one hour. The crystals were filtered out, washed, dried, and screened. The +40 mesh fraction, weighing 6.75 grams, contained 88.2% (5.95 grams) of L-glutamic acid hydrochloride, or 3.45 grams in excess of the seed weight. This represents a recovery of 13.8% of the L-glutamic acid hydrochloride in the original racemic solution.

Example 5

An aqueous solution weighing 200 grams and containing 66% by weight of monoammonium DL-glutamate monohydrate was seeded with 5.0 grams of +40 mesh monoammonium L-glutamate monohydrate and stirred at 30° C. for one hour. The resulting slurry was filtered and the crystals were washed, dried, and screened. The +40 mesh fraction, weighing 11.86 grams, contained 90.6% (10.75 grams) of monoammonium L-glutamate monohydrate, or 5.75 grams in excess of the seed weight. This corresponds to a recovery of 8.75% of the L-isomer present in the original racemic mixture.

The products of my invention ordinarily contain as much as 5–10% of the minor enantiomorph, and for some purposes it is desirable to remove this contaminant. Such purification can conveniently be carried out in accordance with the technique described by Harold L. Fike in application Serial No. 655,805, filed April 29, 1957. In the Fike technique, an L-glutamic acid fraction (for example) containing a small proportion of D-glutamic acid is slurried in water, adjusted to around pH 7 with sodium hydroxide, and diluted or concentrated as required to the saturation level of monosodium L-glutamate. At this point, the D-glutamic acid crystallizes out substantially completely in the form of monosodium DL-glutamate, and can be filtered off. The residual solution is substantially pure monosodium L-glutamate.

While I have described my invention by reference to certain starting materials and processing techniques and conditions, it is to be understood that such matters are illustrative only, and are not intended as a limitation upon the scope of the invention. Numerous modifications and equivalents of the invention will be apparent from the description to those skilled in the art.

In accordance with the foregoing description, I claim as my invention:

1. In a process for resolving a mixture of the enantiomorphic forms of a normally crystalline, optically active compound selected from the group consisting of glutamic acid, the glutamic acid hydrohalides, and the glutamate salts, wherein an aqueous solution supersaturated with said mixture is seeded with crystals of one such enantiomorph and said enantiomorph is selectively crystallized therefrom, and wherein the unseeded enantiomorph eventually begins to crystallize spontaneously therewith, the improvement which comprises effecting said seeding with crystals of a size greater than about 150 mesh, and separating the resulting solids into at least two fractions according to crystal size, at least one of said fractions having a mesh size at least as great as the minimum mesh size of the seed crystals, and said fraction containing predominantly the seeded enantiomorph.

2. The process of claim 1 wherein said compound is glutamic acid hydrochloride.

3. The process of claim 1 wherein said glutamate salt is ammonium glutamate.

4. The process of claim 1 wherein said glutamate salt is zinc glutamate.

5. A process for resolving a DL-glutamic acid hydrohalide which comprises seeding a supersaturated aqueous solution of said DL-glutamic acid hydrohalide with crystals of said glutamic acid hydrohalide in one of its optically active forms, said seed crystals being greater than about 150 mesh in size, crystallizing solids from the solution, and separating said solids into at least two fractions according to mesh size, at least one of said fractions being of a size at least as large as the minimum size of the seed crystals, said fraction comprising glutamic acid hydrohalide in the seeded enantiomorphic form.

6. The process of claim 5 wherein said seed crystals are L-glutamic acid hydrohalide.

7. A process for resolving DL-glutamic acid hydrochloride which comprises seeding a supersaturated solution thereof with crystals of L-glutamic acid hydrochloride having a size within the range of about 25 to 100 mesh, crystallizing solids from the solution, and separating said solids into at least two fractions according to mesh size, at least one of said fractions being of a size at least as large as the minimum size of the seed crystals, said fraction comprising predominantly L-glutamic acid hydrochloride.

8. In a process for resolving a DL-glutamate salt, wherein an aqueous solution supersaturated with said salt is seeded with crystals of one enantiomorphic form of said salt and said enantiomorph is selectively crystallized therefrom, the improvement which comprises effecting said seeding with crystals of a size greater than about 150 mesh, and separating the resulting solids into at least two fractions according to crystal size, at least one of said fractions having a mesh size at least as great as the minimum mesh size of the seed crystals, said fraction containing predominantly the seeded enantiomorph.

9. A process for resolving monoammonium DL-glutamate which comprises seeding a supersaturated solution thereof at a pH between about 6 and about 9 and at a temperature between about 15 and about 35° C. with crystals of monoammonium L-glutamate of a size between about 25 and about 100 mesh, crystallizing solids from the solution, and separating said solids into at least two fractions according to mesh size, at least one of said fractions being of a size at least as large as the minimum size of the seed crystals, said fraction comprising predominantly monoammonium L-glutamate.

10. In a process for resolving a mixture of the enantiomorphic forms of a normally crystalline, optically active compound selected from the group consisting of glutamic acid, the glutamic acid hydrohalides, and the glutamate salts, wherein an aqueous solution supersaturated with said mixture is seeded with crystals of one such enantiomorph A and said enantiomorph A is selectively crystallized therefrom, and wherein the other enantiomorph B eventually begins to crystallize spontaneously therewith, the improvement which comprises effecting said seeding with crystals of a size greater than about 150 mesh, and seeding also with crystals of the other enantiomorph B, the latter seed crystals being at least 100 mesh sizes smaller than the smallest seed crystals of enantiomorph A, and separating the resulting solids into at least two fractions according to crystal size, at least one of said fractions having a mesh size at least as great as the minimum mesh size of the larger seed crystals, said fraction containing predominantly enantiomorph A, and at least one of said fractions having a maximum mesh size smaller than the smallest seed crystals of enantiomorph A, said fraction containing predominantly enantiomorph B.

11. In a process for resolving a DL-glutamic acid compound selected from the group consisting of glutamic acid, the glutamic acid hydrohalides, and the glutamate salts, wherein an aqueous solution supersaturated therewith is seeded with crystals of the corresponding L-glutamic acid compound and said L-glutamic acid compound is selectively crystallized therefrom, the improvement which comprises effecting said seeding with crystals of a size between about 25 and 150 mesh, and seeding also with crystals of the corresponding D-glutamic acid compound of a size smaller than about 200 mesh, said seed crystals differing in size by at least about 100 mesh, and separating the resulting solids into at least two fractions according to crystal size, at least one of said fractions having a mesh size at least as great as the minimum mesh size of the larger seed crystals, said fraction containing predominantly said L-glutamic acid compound, and at least one of said fractions having a maximum mesh size smaller than the smallest seed crystals of said L-glutamic acid compound, said fraction containing predominantly said D-glutamic acid compound.

References Cited in the file of this patent

UNITED STATES PATENTS 2,306,646    Shildneck _____ Dec. 29, 1942

OTHER REFERENCES

Houben: Die Methoden der Organische Chemie, vol.
Gilman: Organic Chemistry, vol. I (1943), pp. 254–5.
II (1943), p. 1065.